(12) United States Patent
Ponnappan et al.

(10) Patent No.: US 7,970,851 B2
(45) Date of Patent: Jun. 28, 2011

(54) METHOD AND SYSTEM FOR MANAGING AND MONITORING VIRTUAL STORAGE SERVERS OF A HOSTING STORAGE SERVER

(75) Inventors: Senthilkumar Ponnappan, Bangalore (IN); Hemanth Pannem, Sathyayedu (IN); Kartik Kumar, Gujarat (IN); Shailaja Kamila, Bangalore (IN); Anshu Surana, Surat (IN)

(73) Assignee: NetApp, Inc., Sunnyvale, CA (US)

( * ) Notice: Subject to any disclaimer, the term of this patent is extended or adjusted under 35 U.S.C. 154(b) by 633 days.

(21) Appl. No.: 11/590,994

(22) Filed: Oct. 31, 2006

(65) Prior Publication Data

US 2008/0104216 A1    May 1, 2008

(51) Int. Cl.
    *G06F 15/16*    (2006.01)
(52) U.S. Cl. ........................................ 709/211
(58) Field of Classification Search ............... None
     See application file for complete search history.

(56) References Cited

U.S. PATENT DOCUMENTS

| | | | |
|---|---|---|---|
| 5,566,319 A | 10/1996 | Lenz | |
| 6,895,429 B2 * | 5/2005 | Banga et al. | 709/215 |
| 6,895,485 B1 | 5/2005 | DeKoning et al. | |
| 7,107,385 B2 * | 9/2006 | Rajan et al. | 711/4 |
| 7,194,519 B1 * | 3/2007 | Muhlestein et al. | 709/215 |
| 7,403,987 B1 * | 7/2008 | Marinelli et al. | 709/223 |
| 2003/0195942 A1 | 10/2003 | Muhlestein et al. | |
| 2004/0030822 A1 * | 2/2004 | Rajan et al. | 711/4 |
| 2004/0215749 A1 | 10/2004 | Tsao | |
| 2005/0204147 A1 | 9/2005 | Yamasaki et al. | |
| 2005/0228835 A1 * | 10/2005 | Roa | 707/204 |
| 2006/0069864 A1 * | 3/2006 | Dalal et al. | 711/114 |
| 2006/0265515 A1 | 11/2006 | Shiga et al. | |
| 2007/0094294 A1 * | 4/2007 | Ellsworth et al. | 707/102 |
| 2007/0100979 A1 | 5/2007 | Soland et al. | |
| 2007/0180168 A1 * | 8/2007 | Chikusa et al. | 710/74 |
| 2007/0220203 A1 | 9/2007 | Murase | |
| 2008/0028143 A1 * | 1/2008 | Murase | 711/114 |

OTHER PUBLICATIONS

Data Ontap 7G, Nov. 16, 2004, Computer Weekly.*
Jain, M. "MultiStore® Discovery, Monitoring, and Reporting in DataFabric® Manager 3.3", Network Appliance, Inc., Sunnyvale, California, Apr. 2006.
International Search Report PCT/US2007/022932 dated Nov. 24, 2009; pp. 1-5.
Written Opinion PCT/US2007/022932 dated Nov. 24, 2009; pp. 1-8.

* cited by examiner

*Primary Examiner* — Moustafa M Meky
*Assistant Examiner* — Clayton R Williams
(74) *Attorney, Agent, or Firm* — Perkins Coie LLP (57) ABSTRACT

A storage management application is provided to manage and monitor virtual storage servers in a hosting storage server. In addition, in order to facilitate virtual storage server management and monitoring, a virtual storage server administrator role is provided. The role is allowed to access details of the virtual storage server assigned to the role, but not the details of the hosting server and other virtual servers.

19 Claims, 7 Drawing Sheets

METHOD AND SYSTEM FOR MANAGING AND MONITORING VIRTUAL STORAGE SERVERS OF A HOSTING STORAGE SERVER

FIELD OF THE INVENTION

At least one embodiment of the present invention pertains to storage systems and more particularly, to managing and monitoring storage systems.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

Multiple instances of virtual storage servers may be created on a physical storage server. A virtual storage server is a functional and logical partitioning of network and storage resources of the physical storage server. Each virtual storage server is maintained and executed independent of other virtual storage servers on the same physical storage server. Storage server resources, such as units of storage and network addresses of network interfaces, may be grouped, partitioned and/or assigned to virtual storage server or servers in the physical storage server. Yet common storage server resources, such as a storage operating system, may be shared among the virtual storage servers. From a client's perspective, a virtual storage server includes all essential aspects of a physical storage server such as a network front-end to communicate with the client, a back-end to access and manage stored data, etc. A physical storage server on which one or more virtual storage servers are created may also be called a hosting storage server or host storage server. For the purposes of illustration, a physical storage server may also simply be referred as a storage server.

In storage servers, data is stored in logical containers called volumes, which may be identical with, or subsets of, aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A sub-volume is a subset of a volume, such as a directory and all files under the directory, a file, etc. A "file system" is an independently managed, self-contained, hierarchal set of data units (e.g., files, blocks or Logical Unit Numbers). Although a volume or file system (as those terms are used herein) may store data in the form of files, that is not necessarily the case. That is, a volume or file system may store data in the form of other units, such as blocks or Logical Unit Numbers (LUNs).

Each virtual storage server is allocated dedicated and distinct units of storage resources, such as volumes or sub-volumes, and network addresses, such as Internet protocol addresses. Each virtual storage server is also allowed shared access to the common file system on behalf of its client system.

A storage server may be managed by one or more network storage administrators (also called "administrative users" or simply "administrators"), who are responsible for configuring, provisioning and monitoring the storage server, scheduling backups, troubleshooting problems with the storage server, performing software upgrades, etc. These management tasks can be accomplished by the administrator using a separate management console on the network, which is a computer system that runs storage management software application specifically designed to manage a distributed storage infrastructure. An example of such storage management software is DataFabric® Manager (DFM), made by NetApp.

Prior art network storage management software manages/monitors only the physical level of a storage server. This limits the usefulness of the management software for architectures that employ virtual storage servers.

SUMMARY OF THE INVENTION

The present invention includes a method and system for managing and monitoring virtual storage servers of a hosting storage server. The method includes the step of, in a network storage manager, managing a storage server which is configured to provide data access services to a set of clients. The network storage manager is operatively coupled to the storage server via an interconnect, a network, for example. The method further includes the step of, in the network storage manager, monitoring a virtual storage server that is hosted in the storage server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for managing and monitoring virtual storage servers of a hosting storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

One embodiment of the present invention discloses a storage management application that provides the functionality of managing and monitoring virtual storage servers in a hosting storage server. In another embodiment of the present invention, in order to facilitate virtual storage server management and monitoring, a virtual storage server administrator role is provided. The role is allowed to access details of the virtual storage server assigned to the role, but not the details of the hosting server and other virtual servers.

Network Environment

Figure 1:
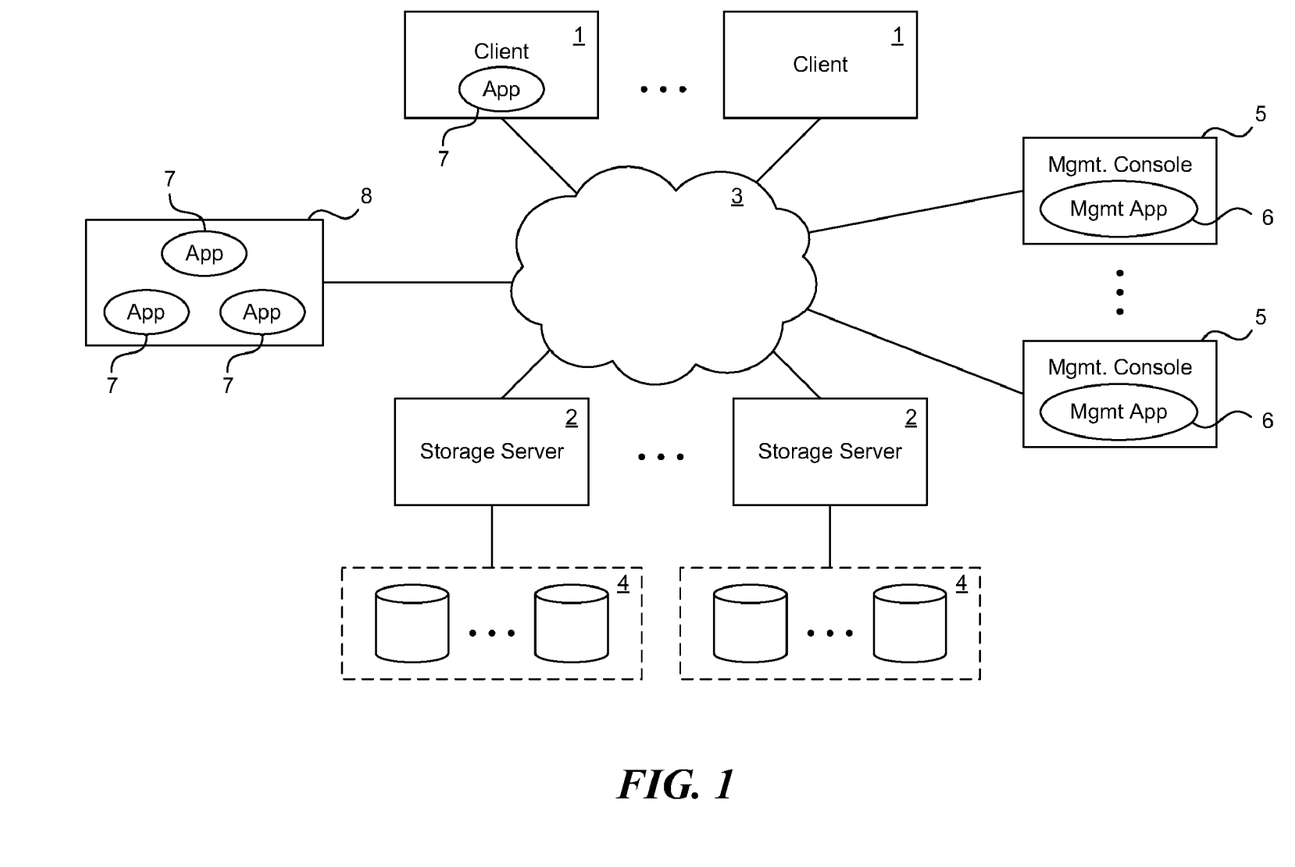
FIG. 1 shows a network environment in which the invention can be implemented.

FIG. 1 shows a network environment in which the invention can be implemented. In FIG. 1, a number of storage servers 2 are each coupled locally to a separate storage subsystem 4, each of which includes multiple mass storage devices. The storage servers 2 are also coupled through an interconnect 3 to a number of clients 1. Each storage subsystem 4 is managed by its corresponding storage server 2. Each storage server 2 receives and responds to various read and writes requests from the clients 1, directed to data stored in or to be stored in the corresponding storage subsystem 4.

Each of the clients 1 may be, for example, a conventional personal computer (PC), server class computer, workstation, or the like. Each storage server 2 may be, for example, a file server used in a NAS mode (a "filer"), a block-based storage server such as used in a storage area network (SAN), or other type of storage server. In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol.

Also connected to the interconnect 3 are one or more management consoles 5, each of which includes a storage management application 6, such as a network storage manager discussed in detail below.

Recently, some storage servers have been designed to have distributed architectures, to facilitate clustering of storage nodes. Clustering facilitates scaling of performance and storage capacity. For example, rather than being implemented in a single box, a storage server may include a separate N- ("network") blade and D- (disk) blade, which are contained within separate housings and communicate with each other via some type of switching fabric or other communication medium. An N-blade is an element that acts as a front-end of a storage server, exporting a file service abstraction to clients. A D-blade manages the underlying storage. Each D-blade typically manages a separate set of disks. Storage servers which implement the Data ONTAP® GX operating system from NetApp can have this type of distributed architecture.

Virtual Storage Server

Figure 2:
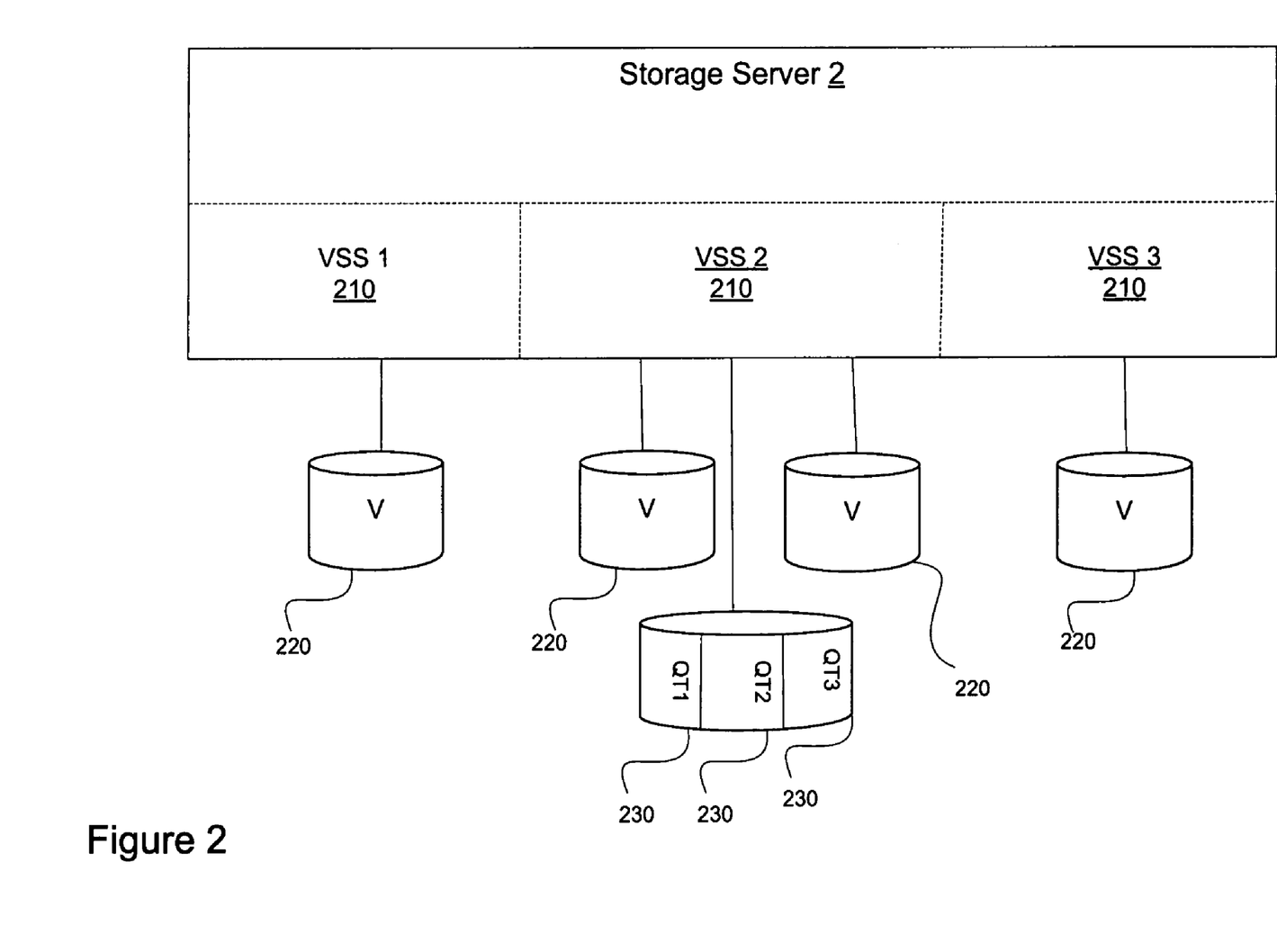
FIG. 2 is a schematic diagram of an embodiment of a storage server 2 of FIG. 1, hosting a plurality of virtual storage servers.

FIG. 2 is a schematic diagram of an embodiment of a storage server 2 of FIG. 1, hosting a plurality of virtual storage servers. Each virtual storage server may be referenced by a logical name, e.g., VSS1-VSS3 210. From the perspective of a client 1, each virtual storage server 210 is separate and distinct from the other virtual storage servers.

The units of storage resources allocated to each virtual storage server 210 include one or more volumes 220 or sub-volume. A qtree (QT1-3) 230, is a sub-volume that has the property of being able to identify itself within a file system by, e.g., a qtree identifier (qtreeid). The above architecture provides efficient utilization and management of these storage resources, including creation, assignment and mapping of the resources to and among the virtual storage servers.

Storage Server Operating System

Figure 4:
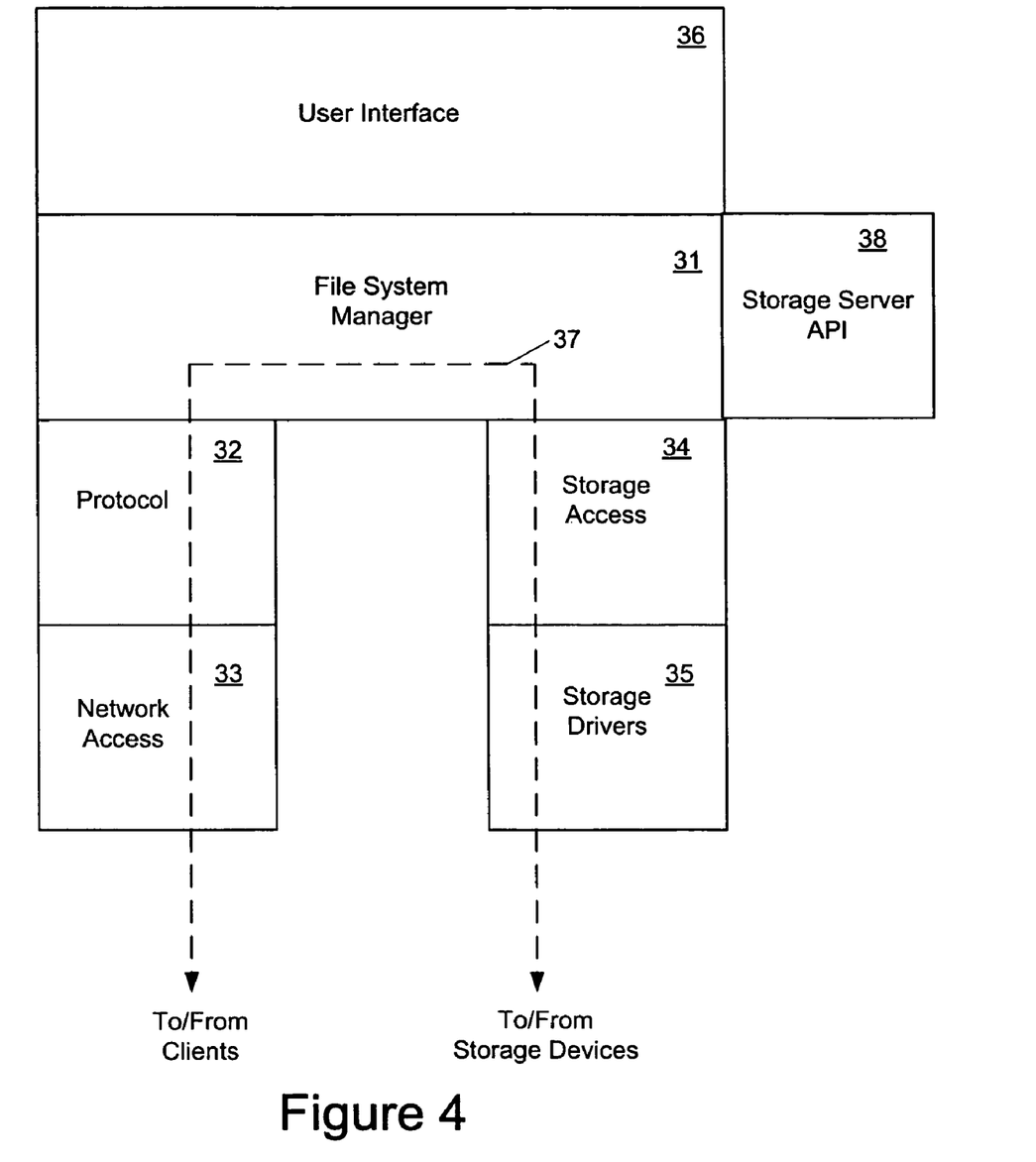
FIG. 4 illustrates the operating system of a storage server.

FIG. 4 illustrates the operating system of a storage server. As shown in FIG. 4, the operating system of the storage server 2 can include several modules, or layers. These modules or layers include a file system manager 31. The file system manager 31 is an application-level programmatic entity which imposes a structure (e.g. hierarchical) on volumes, files, directories and/or other data containers stored and/or managed by a storage server 2, and which services read/write requests from clients of the storage server. An example of a file system manager which has this functionality is the WAFL® file system software that is part of the Data ONTAP® storage operating system from NetApp®.

Figure 3:
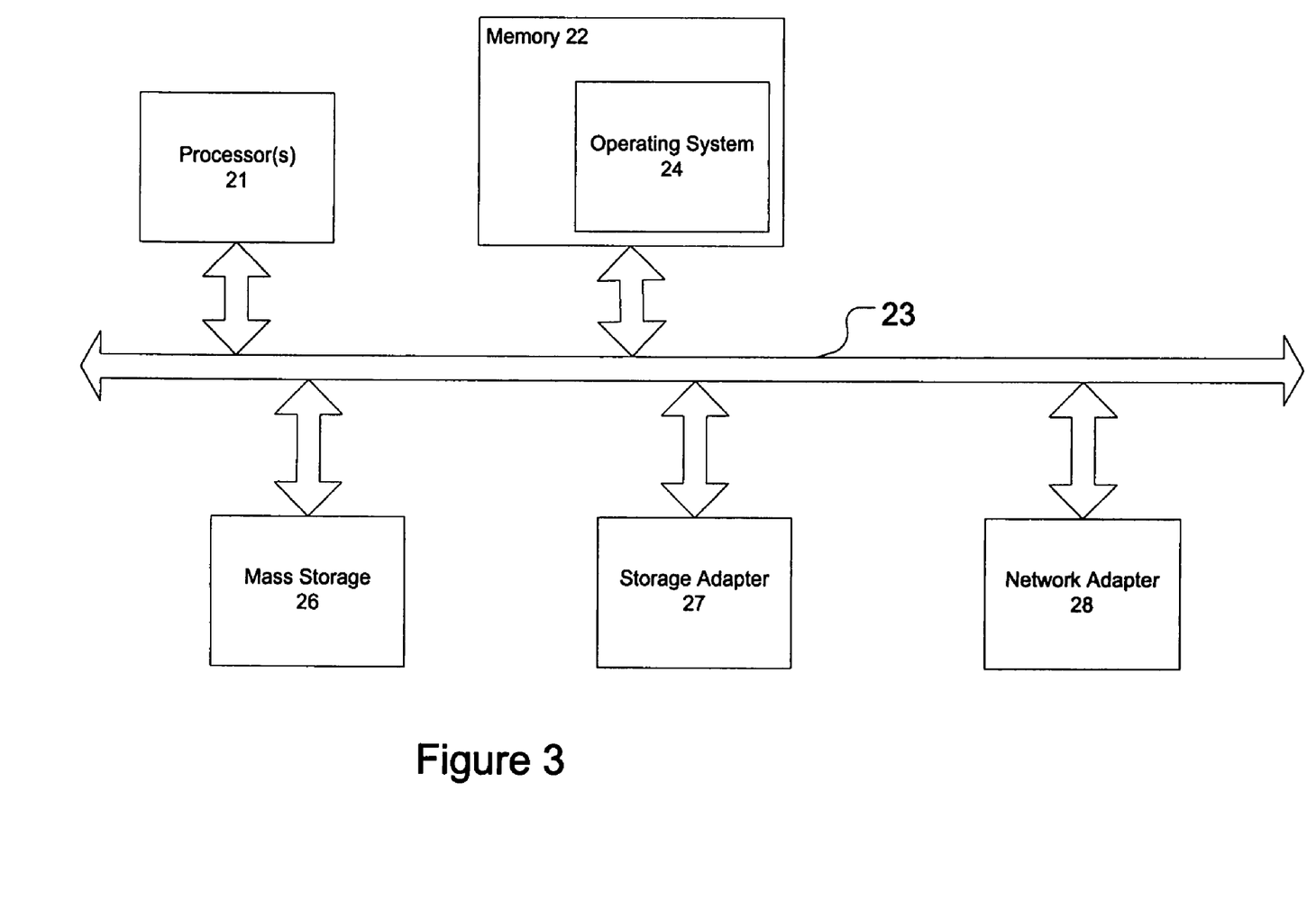
FIG. 3 is a high-level block diagram showing an example of the hardware architecture of a processing system.

Logically under the file system manager 31, the operating system also includes a network layer 32 and an associated network media access layer 33, to allow the storage server 2 to communicate over a network (e.g., with clients 1). The network layer 32 implements various protocols, such as NFS, CIFS, HTTP, SNMP, and TCP/IP. The network media access layer 33 includes one or more drivers which implement one or more protocols to communicate over the interconnect 3, such as Ethernet or Fibre Channel. Also logically under the file system manager 31, the operating system includes a storage access layer 34 and an associated storage driver layer 35, to allow the storage server 2 to communicate with the storage subsystem 4. The storage access layer 34 implements a storage redundancy protocol, such as RAID-4 or RAID-5, while the storage driver layer 35 implements a lower-level storage device access protocol, such as Fibre Channel or SCSI. Reference numeral 37 in FIG. 3 shows the data access path through the operating system, associated with servicing read and write requests from clients.

The operating system may also include a storage server application programming interface (API) 38, through which the operating system and/or an external application may obtain data related to the storage server 2 and its storage sub-system 4.

Network Storage Manager

Figure 5:
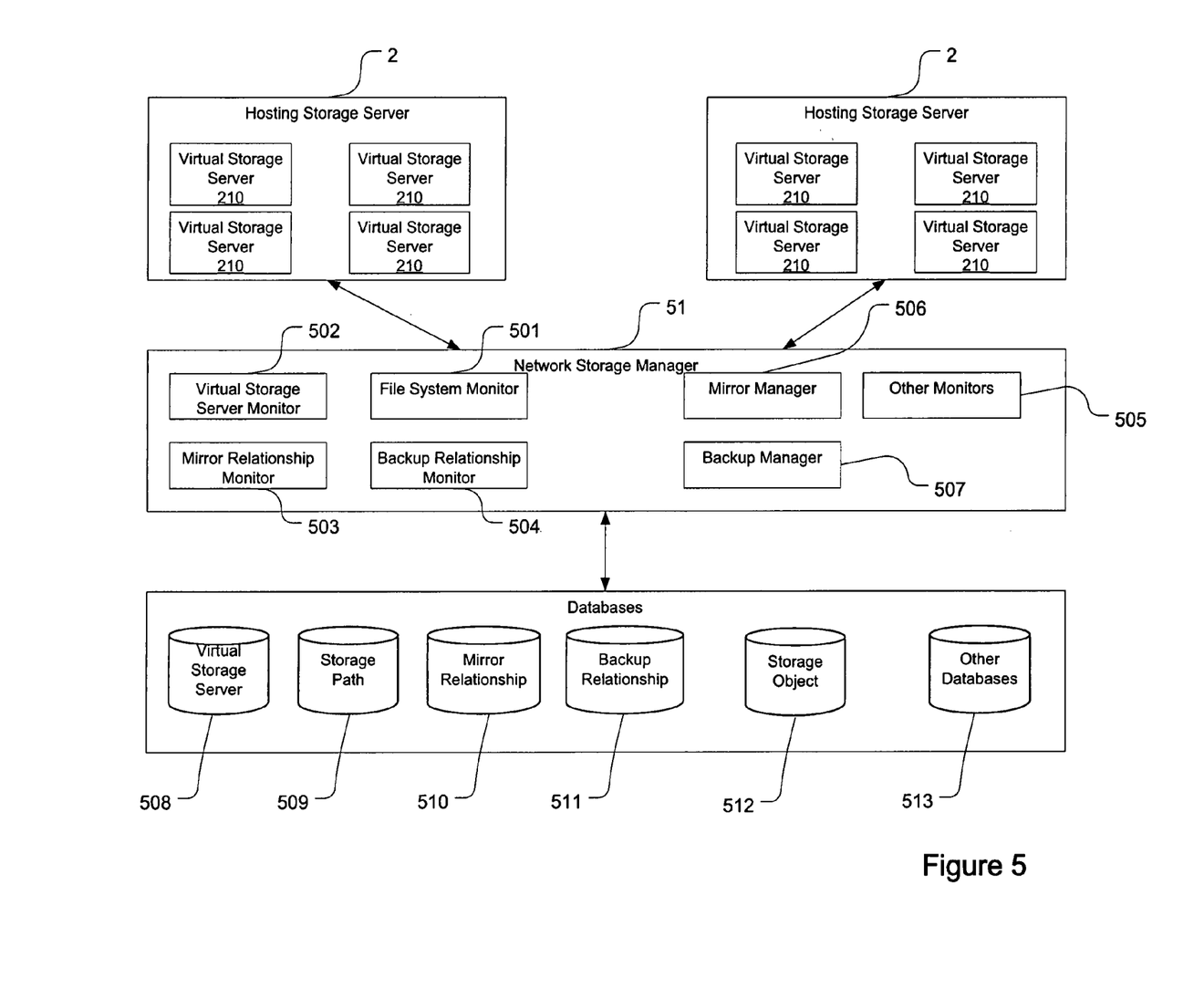
FIG. 5 illustrates an exemplary architecture of a network storage manager and its underlying databases according to an embodiment of the present invention.

FIG. 5 illustrates an exemplary architecture of a network storage manager and its underlying databases according to an embodiment of the present invention. A network storage manager 51 is an example of the storage management application 6 shown in FIG. 1. The network storage manager 51 may manage one or more storage servers 2, and each storage server 2 may host a number of virtual storage servers 210. The network storage manager 51 has a number of monitors. Each monitor can be software, special-purpose circuitry, or combination thereof. The file system monitor 501 monitors volumes and/or sub-volumes on the hosting storage servers 2. The virtual storage server monitor 502 is responsible for discovering and monitoring virtual storage servers on each hosting storage servers 2. The mirror relationship monitor 503 and the backup relationship monitor 504 are respectively responsible for monitoring mirror and backup relationships for a virtual storage server 210. Other monitors 505, such as a LUN monitor, manage and monitor resources of a virtual storage server 210.

The network storage manager 51 may also include a mirror manager 506, which may, according to a user's (administrator's) direction, automatically configure a mirror relationship involving a virtual storage server 210 (whether the virtual storage server is a source server or a destination server in the mirror relationship). Similarly, the backup manager 507 may automatically configure a backup relationship in which a virtual server 210 is a backup server. Creation and configuration of mirror and backup relationships will be further discussed below.

Management data and monitoring information are stored in the underlying databases. Respectively, the virtual storage server database 508 stores data related to each virtual storage server 210, such as the virtual storage server's ID, name, hosting storage server ID, and status. The storage path database 509 holds the storage path details for each virtual storage server 210. Storage paths are paths of storage objects or network resources. In one embodiment, each record in the storage path database 509 includes a virtual storage server ID field, a storage path field, an indicator field indicating whether the storage path field records the primary storage path for the virtual storage server (i.e., the storage path that has/etc directory of the virtual storage server), a volume/sub-volume ID field indicating that the volume/sub-volume is assigned to the virtual storage server, a timestamp field recording the time the storage path is added.

The mirror relationship database 510 and the backup relationship database 511 store data related to the mirror and backup relationships of each virtual storage server 502. The storage object database 512 maintains status and ownership information for each storage object of the hosting storage server, e.g., a volume, a sub-volume or a LUN. The other databases 513 maintain data related to other aspects of the management and/or monitoring of the virtual storage servers 210.

It will be appreciated by a person or ordinary skill in the art that the above introduced monitors may be implemented as different functions and/or modules of one single general monitor. The above description is only for purposes of illustration.

Figure 6:
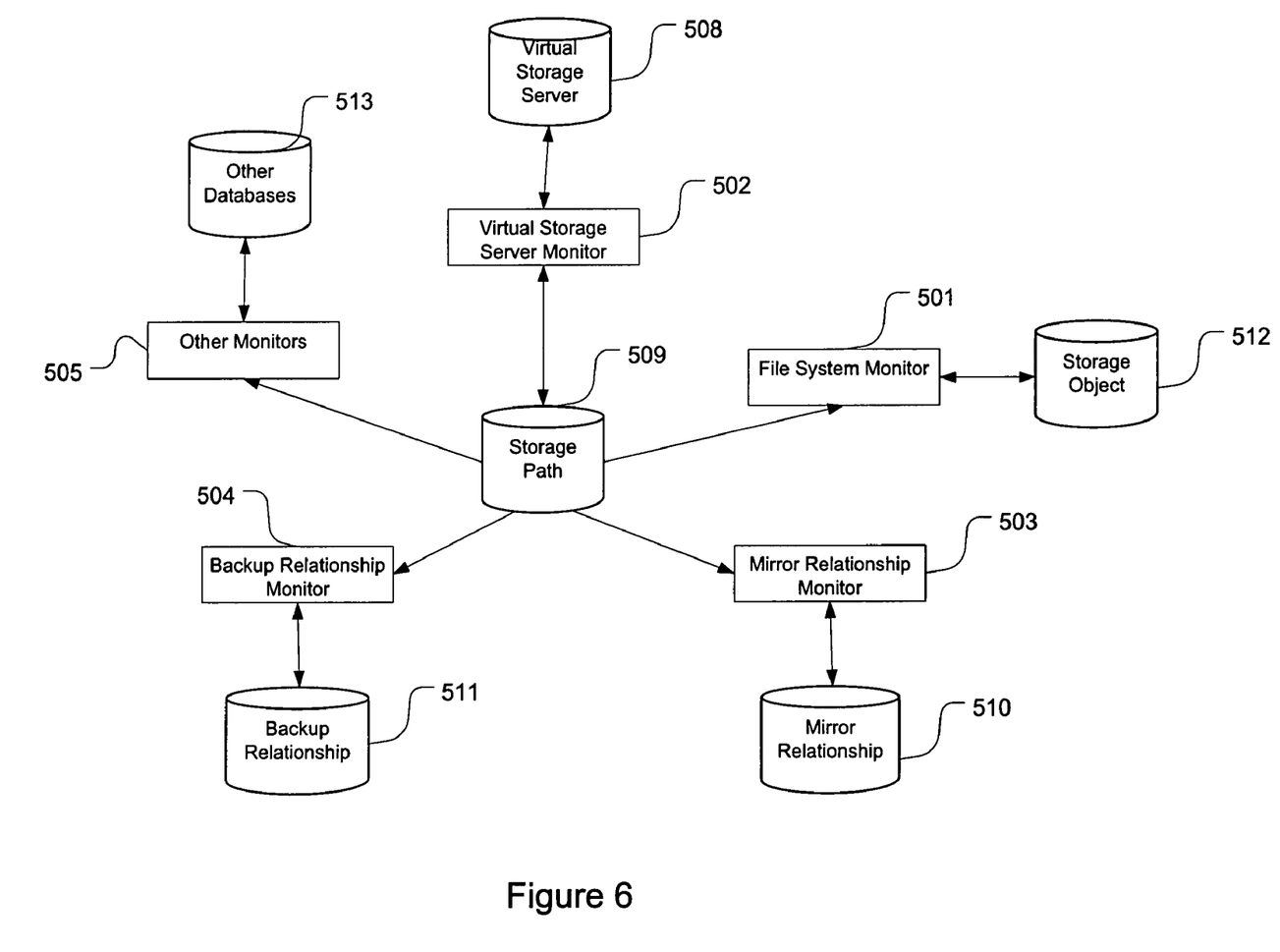
FIG. 6 illustrates an example of the relationships among the monitors and databases illustrated in FIG. 5.

FIG. 6 illustrates an example of the relationships among the monitors and databases described above. The direction of each arrow indicates the direction of data flow. As shown, the storage path database 509 plays a center role in storage object ownership management. Initially, each storage object (e.g., a volume, a qtree, a LUN) is assigned to the hosting storage server. When a storage object is later assigned to a virtual storage server (by an administrator, for example), the virtual storage server monitor 502 automatically adds an entry into the storage path database 509 to record the assignment of the storage object to the virtual storage server. The timestamp field of the entry in the storage path database 509 records the latest time the entry is changed or added. This will enable other monitors to make ownership changes for the storage object upon the next execution of these other monitors. For example, the file system monitor 501 reads the newly added entry from the storage path database 509, and determines from the timestamp of the entry that the change is new relative to the last time the file system monitor 501 executed. Then, the file system monitor 501 changes ownership of the object by changing ownership field from the hosting storage server to the virtual storage server in storage object database 512. Similarly, the mirror relationship monitor 503 and the backup relationship monitor 504 each read the newly added storage path from the storage path database 509 and update the appropriate entries in the mirror relationship database 510 and the backup relationship database 511, respectively.

The above described ownership change mechanism allows each monitor to change its corresponding database asynchronously relative to making changes to the storage path database 509 to indicate the ownership change. Yet in another embodiment, these databases may be changed synchronously upon an event of ownership change.

Discovering Virtual Storage Servers

As discussed above, the virtual storage server monitor 502 is responsible for discovering virtual storage servers on a particular hosting storage server. The virtual storage server monitor 502 may be invoked to discover new virtual storage servers on a hosting storage server by an administrator manually, or it may be automatically and periodically invoked at a predetermined time interval (an hour, for example). Basic details of a virtual storage server can be obtained by the monitor 502. These basic details can include: name of the virtual storage server, IP space for which it belongs to, allowed protocols for this virtual storage server, disallowed protocols for this virtual storage server, list of all network resources of the virtual storage server, status of the virtual storage server (e.g., "stopped" or "running"), and list of all storage objects maintained by the virtual storage server.

A global option, discover_virtual_storage_server, may be implemented in the virtual storage server monitor 502. If the option is disabled, the virtual storage server monitor 502 will not discover new virtual storage servers, but will continue to monitor the virtual storage servers that have already been discovered.

Each time the virtual storage server monitor 502 runs, it will discover the new virtual storage servers added for a hosting storage server. A virtual storage server may be destroyed, for example, by releasing all resources to the physical storage server and removing the configuration information associated with the virtual storage server. When the virtual storage server monitor 502 detects that a virtual storage server is destroyed, it will mark it as destroyed in the virtual storage server database 508.

Managing and Monitoring Virtual Storage Servers

In an embodiment of the present invention, the network storage manager 51 checks the status of the virtual storage servers and their associated resources and alerts the user of any anomalous conditions, discrepancies, etc. The virtual storage server monitor 502 can be configured to execute, for example, every five minutes to check status changes of virtual storage server(s), for example, being "stopped" or "destroyed". It performs calls to the storage server API 38 on the hosting storage server to track the status of the virtual storage server(s) hosted on it. In an alternate embodiment, a separate monitor may periodically check status of the virtual storage server(s) via calling the storage server API 38. In case there are changes in the status, the separate monitor can invoke the virtual storage server monitor 502 to update the status information of the virtual storage servers stored in the virtual storage server database 508.

Initially, any storage object (a volume, for example) created on a hosting storage server is owned by the hosting storage server. If a storage object is later assigned to a virtual storage server of the hosting storage server, then upon running, the virtual storage server monitor 502 adds an entry into the storage path database 509 to indicate that the storage object is assigned to the virtual storage server. The next time when the file system monitor 501 runs and detects the newly added entry, the file system monitor 501 changes the ownership of the storage object from the hosting storage server to the virtual storage server.

If a storage object is removed from a virtual storage server, the virtual storage server monitor 502 detects that event and changes the corresponding entry in the storage path database 509. The next time the file system monitor 501 runs, it will check whether any ownership changes for storage objects need to be updated. In this case, the file system monitor 501 changes the ownership for the storage object from the virtual storage server back to the hosting storage server.

Managing Mirror Relationships

To create a mirror relationship involving a virtual storage server (e.g., whether the virtual storage server is the source server or the destination server), the corresponding hosting storage server or servers needs to be configured with appropriate storage paths.

In an embodiment, the network storage manager 51 provides an interface through which an administrator of a virtual storage server 210 (or any user with proper privilege to manage the virtual storage server) may select or designate the virtual storage server 210 as an entity in a mirror relationship, e.g., a source server or a destination server. This interface may be a user interface or an application programming interface (API), through which an instruction to create a mirror relationship may be transmitted to the mirror manager 506.

Figure 7:
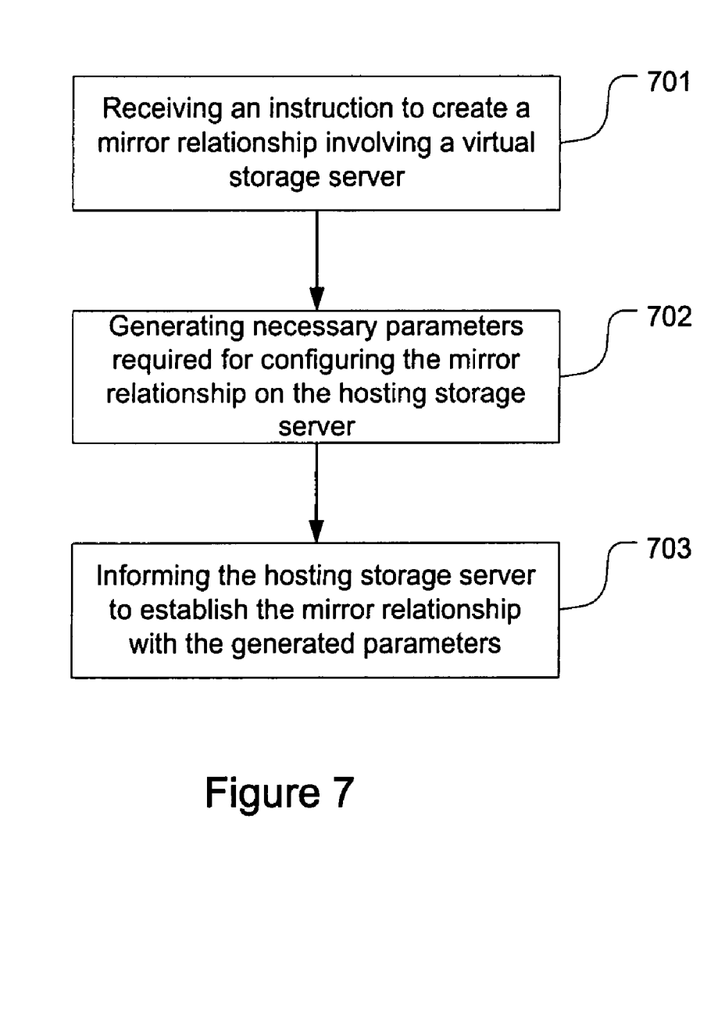
FIG. 7 is a flow diagram illustrating a process of creating a mirror relationship involving a virtual storage server.

FIG. 7 is a flow diagram illustrating a process of creating a mirror relationship involving a virtual storage server. At step 701, the mirror manager 506 receives an instruction to create a mirror relationship involving a virtual storage server 210. The instruction includes information (or parameters) identifying the source and destination of the mirror relationship. At step 702, based on the information provided by the instruction, the mirror manager 506 automatically generates necessary parameters required for configuring the mirror relationship on the hosting storage server 2. An example of one of the necessary parameters is storage path, which is used by a hosting storage server to configure mirror relationship. At step 703, after the necessary parameters are generated, the mirror manager 506 informs the hosting storage server 2, by calling the storage server API 38, for example, to establish the mirror relationship with the generated parameters.

For example, assume a volume, v-1, belongs to virtual storage server VSS-1 and another volume, v-2, belongs to virtual storage server VSS-2. Further assume that VSS-1 belongs to hosting storage server HSS-1 and VSS-2 belongs to hosting storage server HSS-2. To create a mirror relationship between v-1 and v-2, a storage path HSS-1:/vol/v-1 is generated for HSS-1 and a storage path HSS-1:/vol/v-2 is generated for HSS-2. These storage paths are respectively specified as source and destination paths by HSS-1 and HSS-2 to establish the mirror relationship. Note that the format of the storage paths given in the above example is only for purposes of illustration. A person of ordinary skill in the art will realize that a different format for storage paths may be implemented in the present invention.

Managing Backup Relationships

In a manner similar to managing mirror relationships, an administrator may input an instruction to the backup manager 507 via the user interface 36 to create a backup relationship in which a virtual storage server 210 selected by the administrator is a backup server.

Figure 8:
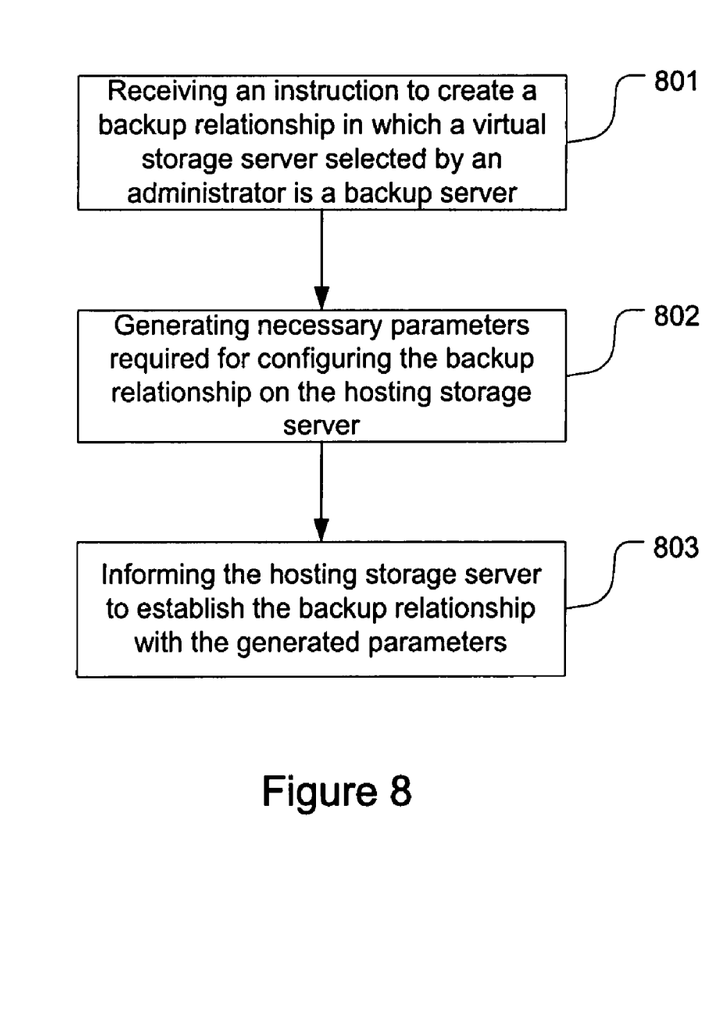
FIG. 8 is a flow diagram illustrating a process of creating a backup relationship involving a virtual storage server.

FIG. 8 is a flow diagram illustrating a process of creating a backup relationship involving a virtual storage server. At step 801, the backup manager 507 receives an instruction to create a backup relationship in which a particular virtual storage server 210 is selected to be a backup server. At the same time, the backup manager 507 also receives parameter(s) representing the primary source to be backed up. At step 802, the backup manager 507 automatically generates necessary parameters (e.g., storage paths) required for configuring the backup relationship on the hosting storage server 2. At step 803, after the necessary parameters are generated, the backup manager 507 informs the hosting storage server 2, by calling the storage server API 38, for example, to establish the backup relationship with the generated parameters.

For example, assume again that volume, v-1, belongs to virtual storage server VSS-1 which belongs to hosting storage server HSS-1; and volume, v-2, belongs to virtual storage server VSS-2 which belongs to hosting filer HSS-2. To create a backup relationship between a primary source q-1 in v-1 and secondary destination q-2 in v-2, storage paths HSS-1:/vol/v-1/q-2 and HSS-2:/vol/v-2/q-2 are generated and specified respectively by HSS-1 and HSS-2.

Security Control over Virtual Storage Servers

In a storage service providers (SSP) environment, an administrator will be allocated one or more virtual storage servers. The administrator should have permissions only to the virtual storage server(s) allocated to him. The administrator should not have permissions to other virtual storage servers and the hosting storage server(s) details in the network.

More specifically, the administrator should have permissions to access only resource(s) uniquely assigned to the virtual storage server(s) allocated to him. A resource may be, for example, a storage object (e.g., a volume, a sub-volume, a LUN), an aggregate (logical container for storage objects), a storage device (physical container for storage objects), or a network address (e.g., an IP address). A resource is considered to be uniquely assigned to a virtual storage server if the storage server is logically and entirely associated with the virtual storage server. For example, a volume assigned to a virtual storage server in its entirety is uniquely assigned to the virtual storage server. However, when only a part of a volume (a sub-volume, for example) is assigned to a virtual storage server, the volume is not uniquely assigned to the virtual server, although that part of the volume is uniquely assigned to the virtual server.

In an exemplary embodiment, details of an aggregate and/or a storage device are always hidden from an administrator of a virtual storage server, because aggregates may contain other volumes which are not part of the virtual storage server.

FIG. 3 is a high-level block diagram showing an example of the hardware architecture of a processing system. The hardware architecture may apply to both the storage server 2 and the management console 5 of FIG. 1. Certain standard and well-known components which are not germane to the present invention are not shown. The processing system includes one or more processors 21 coupled to a bus system 23.

The bus system 23 in FIG. 3 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The processors 21 are the central processing units (CPUs) of the processing system and, thus, control the overall operation of the processing system. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 22 coupled to the bus system 43. The memory 22 represents any form of random access memory (RAM), read-only memory (ROM), flash memory, or a combination thereof. Memory 22 stores, among other things, the operating system 24 of processing system.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the processing system to access a storage subsystem and may be, for example, a Fibre Channel adapter or a SCSI adapter. The network adapter 28 provides the processing system with the ability to communicate with remote devices over a network and may be, for example, an Ethernet adapter or a Fibre Channel adapter.

Memory 22 and mass storage device 26 store software instructions and/or data, which may include instructions and/or data used to implement the techniques introduced here.

Thus, a method and system for managing and monitoring a virtual storage server of a hosting storage server have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware (e.g., special purpose or general purpose circuitry) and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    in a network storage manager, managing a host server which is configured to provide data access services to a set of clients, wherein the network storage manager is operatively coupled to the host server via an interconnect;
    in the network storage manager, discovering a first virtual storage server (VSS) that is hosted in the host server;
    in the network storage manager, monitoring the first VSS and a storage object of the first VSS, wherein the storage object is a logical representation of a physical storage device;
    in the network storage manager, automatically generating configuration parameters for use by the host server to establish a relationship involving the first VSS and a second VSS, wherein the relationship is a mirroring relationship in which the first VSS is a source server or a destination server, or a backup relationship in which the first VSS is a backup server;
    in the network storage manager, monitoring the relationship between the first VSS and the second VSS; and
    in the network storage manager, controlling an administrator role's privileges associated with the first VSS hosted in the host server and the second VSS so that the administrator role's privileges associated with the first VSS and the second VSS are limited to resources uniquely assigned to the first VSS and the second VSS.

2. The method of claim 1, wherein the network storage manager runs on a management console coupled to the host server via the interconnect.

3. The method of claim 1, wherein said monitoring of the first VSS comprises monitoring a status of the first VSS.

4. The method of claim 3, wherein the status of the first VSS is one of a running status, a down status, or a destroyed status.

5. The method of claim 3, wherein said monitoring of the storage object further comprises monitoring assignment of the storage object to the first VSS from the host server.

6. The method of claim 5, wherein the storage object is a volume, a subvolume, or a Logical Unit Number (LUN).

7. The method of claim 1 further comprising, in the network storage manager, storing results of said monitoring in a database or databases; and generating a report based on data stored in the database-or databases.

8. The method of claim 1 further comprising, in the network storage manager, discovering the storage object of the first VSS and changing an ownership of the storage object from the host server to the first VSS.

9. The method of claim 1, wherein the discovery of the previously unmonitored VSS is performed automatically and based on a global indicator at the network storage manager.

10. The method of claim 9, wherein, as part of the discovery of the previously unmonitored VSS, an IP space, a status and an available protocol of the VSS are determined.

11. The method of claim 1, further comprising monitoring, at the network storage manager, a backup relationship in which the VSS includes a backup server.

12. The method of claim 1, wherein the first VSS and the second VSS are hosted on separate physical servers.

13. A processing system comprising:
    a processor;
    a network interface through which to communicate with a host server;
    a memory coupled to the processor;
    first logic to monitor a status of a first virtual storage server (VSS) hosted in the host server;
    second logic to monitor a first storage object assigned to the first VSS from the host server, wherein the first storage object is a logical representation of a physical storage device;
    third logic to monitor a mirror relationship between the first VSS and a second VSS;
    fourth logic to monitor a backup relationship in which the first VSS includes a backup server;

discovery logic to locate a previously unmonitored virtual storage server that is hosted in the host server;

relationship logic to automatically generate configuration parameters for use by the host server to establish a relationship involving the first VSS and the second VSS, wherein the relationship is a mirroring relationship in which the first VSS is a source server or a destination server, or a backup relationship in which the first VSS is a backup server; and privilege logic to control an administrator role's privileges associated with the first VSS hosted in the server so that the administrator role's privileges associated with the first VSS are limited to resources uniquely assigned to the first VSS.

14. The processing system of claim 13 further comprising:

a first database to record the status of the first VSS;

a second database to record information related to monitoring the first storage object;

a third database to record information related to monitoring the mirror relationship; and a fourth database to record information related to monitoring the backup relationship.

15. The processing system of claim 14, wherein each of the first, second, third and fourth logic updates the first, second, third and fourth databases respectively to indicate an ownership change of a second storage object.

16. The processing system of claim 14 further comprising a fifth logic to generate a monitoring report.

17. The processing system of claim 16 further comprising a sixth logic to display the report.

18. The processing system of claim 13 wherein the discovery logic is further configured to discover the storage object at the first VSS and change an ownership of the storage object from the host server to the first VSS.

19. The system of claim 13, wherein a network resource and a storage object, each currently accessible to the previously unmonitored VSS, are determined as part of the discovery of the previously unmonitored VSS.

* * * * *